L. E. GILES.
COMPUTING MACHINE.
APPLICATION FILED SEPT. 4, 1919.
1,370,426.
Patented Mar. 1, 1921.
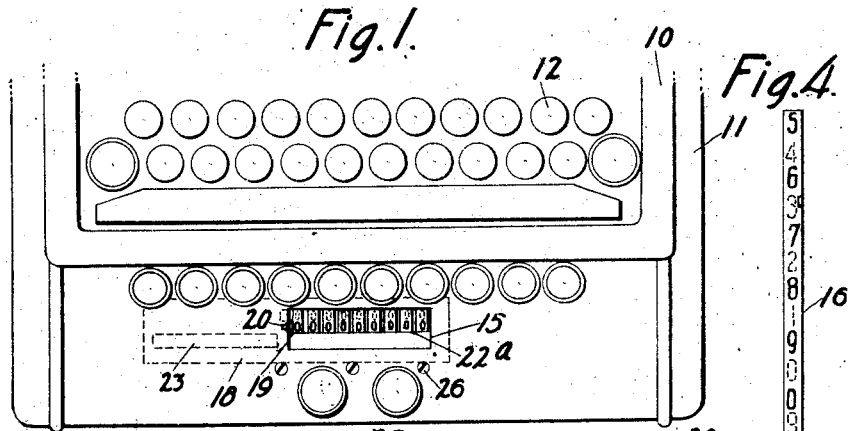
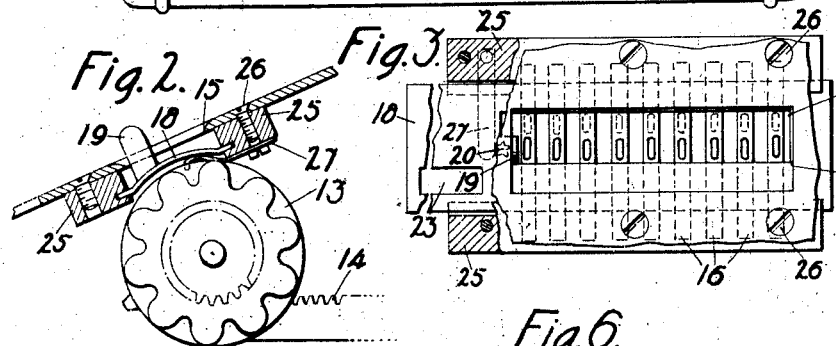
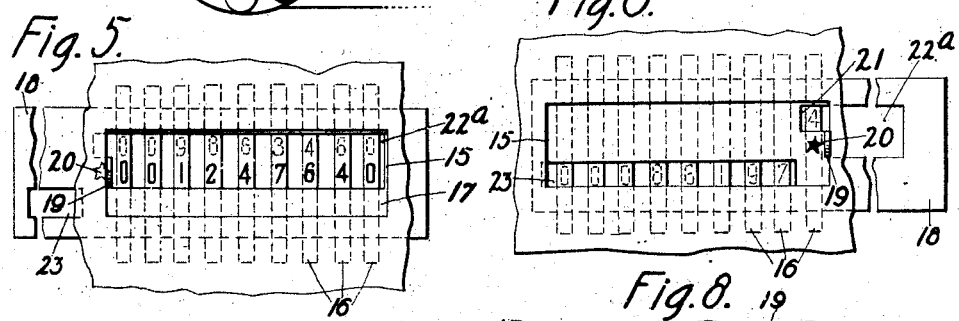
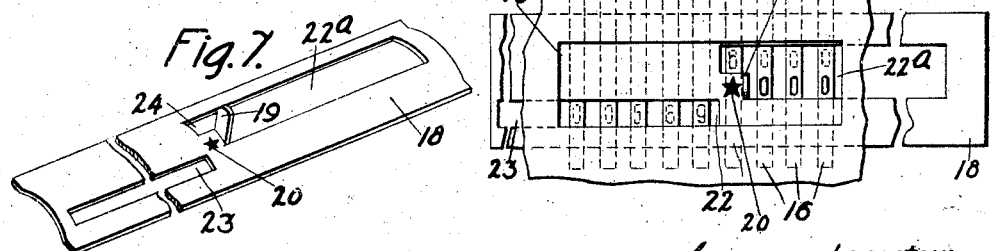
Inventor:
Louis E. Giles
by O. C. Stickney
Attorney

UNITED STATES PATENT OFFICE.

LOUIS E. GILES, OF NEW YORK, N. Y., ASSIGNOR TO UNDERWOOD COMPUTING MACHINE COMPANY, OF NEW YORK, N. Y., A CORPORATION OF NEW YORK.

COMPUTING-MACHINE.

1,370,426.      Specification of Letters Patent.      Patented Mar. 1, 1921.

Application filed September 4, 1919. Serial No. 321,616.

*To all whom it may concern:*

Be it known that I, LOUIS E. GILES, a citizen of the United States, residing in New York, in the county of New York and State of New York, have invented certain new and useful Improvements in Computing-Machines, of which the following is a specification.

This invention relates to improvements in computing machines, and especially to machines capable of effecting algebraic computations, that is, of adding positive and negative numbers irrespective of their relative magnitudes, and of indicating the correct result whether positive or negative.

The invention is herein disclosed as applied to a computing machine of the Underwood-Hanson type, such as the one illustrated and described in the Patent No. 1,278,812, granted September 10, 1918, to Hans Hanson, but is adapted for use in connection with any computing machine having a register or totalizer comprising movable number wheels or other figure-carrying elements, and means for effecting either addition or subtraction by varying the positions of said figure-carrying elements.

The number wheels of the totalizer are provided with figures to represent positive values, and with figures to represent negative values, and the indexing means, associated with said number wheels, is such as to concomitantly direct attention to three rows of said figures, one of said rows comprising figures intended for one of said purposes, and the other two rows comprising figures intended for the other of said purposes.

The relative arrangement of the figures of the different sets on the number wheels may be varied, but the location of the indexing means will be determined by the particular arrangement selected. In the form herein disclosed, each number wheel is provided with two series of figures running consecutively from "0" to "9" in opposite directions, the figures of one series being so grouped with respect to those of the other that the sums resulting from the successive additions of any digit selected from figures of one series to the two adjacent digits of the other series will equal 9 and 10, respectively. The number wheels are shown as placed within an inclosure such as to form a shield having a portion cut away to expose the three rows of figures from which the readings are to be taken. This cut-away portion may constitute a slot or opening of such width as to expose three continuous figures on each number wheel.

The invention as herein disclosed comprises a shutter or reading gage, which may be adapted to reduce the likelihood of error when reading a negative result. This shutter or reading gage may be either a separate device, which may be positioned by hand over the sight-opening of the totalizer in a location which may be readily determined, and which will conceal all of the figures intended for use in making negative readings except the particular ones which represent the number accumulated in the totalizer, or the said shutter or reading gage may be slidably mounted in the machine frame, as herein specifically illustrated and described, so as to be easily moved to a position such as will definitely point out the figures to be used in making a negative reading.

The normal position of the shutter may be such as to expose the whole row of figures from which positive readings are to be taken. Whenever a "9" of the figures indicative of positive results appears at the sight-opening on the left-hand number wheel, the operative will be aware that a negative result has been accumulated in the totalizer. In such case the shutter or reading gage may be moved until a star or other designating character carried thereby is caused to cover the last significant figure of the row used for indicating positive results. When so positioned, the shutter will expose the particular figures of the two rows to be used for indicating negative results from which the negative reading is to be taken and will conceal all of the others.

The shutter may be provided with a finger-piece to be used in moving the same from one position to the other, and this finger-piece may at the same time constitute a stop to coöperate with the ends of the sight-opening and thus limit the movement of the shutter in each direction.

Other features and advantages will hereinafter appear.

In the accompanying drawings,

Figure 1 is a fragmentary plan view of an Underwood bookkeeping machine, showing the present invention as applied thereto.

Fig. 2 is a fragmentary sectional side view of the same, adapted to bring out the relationship of the computing wheels and the shutter.

Fig. 3 is a view of a small portion of Fig. 1 on a very much enlarged scale.

Fig. 4 is a developed view of the periphery of a computing or numeral wheel, adapted to be used in the present invention.

Fig. 5 is a view similar to Fig. 3, but showing a positive number registered upon the computing wheels.

Fig. 6 is a view similar to Fig. 5, but showing a negative number registered upon the computing wheels.

Fig. 7 is a perspective view of the shutter shown in Figs. 1 to 3, 5 and 6.

Fig. 8 is a view similar to Fig. 6, but showing a different negative number registered.

The usual Underwood bookkeeping machine includes a typewriter frame 10, a computing casing 11, typewriter keys 12, and numeral wheels 13, the latter adapted to be revolved in the casing 11, by means of rack-bars 14, to add or subtract numbers written by the typewriter numeral keys. One form of mechanism for effecting such computations is shown in the above-mentioned patent to Hans Hanson; and, since said machine is on the market in various well-known forms, the details of the computing mechanism will be, for the most part, omitted.

Before beginning a computation, the typist sees that the wheels all stand at "0," as shown in Fig. 3. The typist may then actuate the numeral keys to add the number 1247640, the carrying of the numbers into the computing wheels being effected in the usual way. In the form of the mechanism herein shown, the typist sees the number thus written displayed upon the numeral wheels at a sight-opening 15, the numerals being arranged on the periphery of the wheel, according to the present invention, as shown in Fig. 4, in which the usual celluloid band 16, upon which the numerals are inscribed, is shown unwound from the wheel. For the purposes of illustrating the present invention, the band 16 is illustrated as comprising not only the usual black digits, but also as comprising, between them, red or negative digits, running in a direction opposite to the black digits, the red and black digits being arranged alternately, so that each pair, beginning with a "9" and an oppositely colored "0," will add up to nine. For the purposes of the present invention, the two series of digits are advantageously so related to each other that the two zeros stand next to each other between the red "9" and the black "9," with the result that if the black digits are paired with the red digits above instead of those below them, each pair adds to ten. This conduces to the ease of reading them for purposes which will hereinafter appear. The typist in the form of the invention herein illustrated normally sees not only the black digits at the sight-opening 15, but also one row of red digits adjacent them. The red digits, in the form of wheel illustrated in Fig. 4, stand immediately above the black digits, with which they pair to add to ten, with the result that, as shown in Fig. 5, the typist is able to read not only the black digits named above, but also the complementary red digits 9863460 paired with them. The typist ignores these red digits for ordinary work, and pays attention only to the black digits.

The left-hand black digit is normally "0," but, when the machine begins to compute numbers giving negative results, the left-hand black digit becomes "9," for reasons well known to those skilled in the art.

If from the positive number 1247640, shown in Fig. 5, the typist subtracts the larger number 2109614, the number displayed at the sight-opening 15 should be the number 861974. This is to be read in part from a lower row of red digits, which, however, are normally concealed by the lower wing 17 of a shutter 18. The typist, instead of immediately reading the number just mentioned, sees that the left-hand digit is a "9," and consequently seizes a handle 19 of the shutter 18 and slides the shutter along, carrying the wing 17 clear of the digits 861, etc., and covering up the black digits until a star 20 on the shutter stands immediately under the right-hand significant digit of the row of red digits seen in Fig. 5. The shutter is cut away at 21, above the star 20, to leave said last significant digit visible, with the result that the star covers the last significant black digit. Then the typist reads the digits now displayed. Inspection shows that the correct digits 861974 are visible, the last or right-hand digit in this case being read from the top row of red digits. As is well known to those skilled in the art, the last digit in the bottom row is erroneous. If from the negative number 861974, already shown, the typist subtracts the number 4836026, the result shown should be the negative number 5698000. In order that this number may appear, the typist performs the same operation as was described for Fig. 6, viz.; shifts the shutter 18 until its star 20 stands under the right-hand significant digit of the top row of red digits, in this case the digit "8." The shutter thus positioned displays the red digits 569 in the lower row of red digits and the digit 8 in the upper row, the latter followed by three red zeros.

It will be found that no matter what the negative number is, the typist, warned, by the left-hand black digit 9, that a negative number is to be read, will find the correct red digits and read them directly, by shifting the shutter 18, so that the star 20 stands beneath the right-hand significant digit of the top row. For this setting, the typist has only to bear in mind one commonly accepted definition of a digit, viz., that it is one of the numerals from "1" to "9," inclusive.

To enable the lower row of red digits to be read, the wing 17 is cut away just to the left of the star 20, as shown at 22 in Fig. 8, enough of the wing being left to obscure the black digits to the left of the star. The shutter 18 may be of any desired construction, and is herein shown as a plate having two openings 22ª and 23, the former of which is used for reading the digits in ordinary computing, that is to say, in computing with positive numbers. The opening 23 is used for reading the digits of negative numbers to the left of the star, and the opening 22ª includes an extension 24, adapted to display the upper red digit above the star. The shutter 18 may be slidable in guides 25, held by screws 26, upon the interior of the casing 11, and may be detained where set by a spring detent 27, adapted to bear against its under side. The handle 19 forms a convenient stop for arresting the shutter at the limits of its travel. It never travels farther to the right than the Fig. 6 position. After a negative number is read off in that position of the shutter, the shutter should be returned to its Fig. 3 position to always keep the highest black digit visible.

Variations may be resorted to within the scope of the invention, and portions of the improvements may be used without others.

Having thus described my invention, I claim:

1. In a computing machine adapted to add and subtract, the combination with numeral wheels each bearing complementary digits of two sets to enable positive results to be read from a row of digits of one set and negative results to be read from a row of digits of the other set with a known error, of a manually operable shutter adapted when properly set to obscure the erroneous digits in the last-mentioned row and direct the attention to the correct digits at other places on the same wheels.

2. In a computing machine adapted to add and subtract, the combination with numeral wheels bearing complementary digits in pairs to enable positive numbers to be read from a row of digits of one set and negative numbers to be read from a row of digits of the other set with a known error, of a shutter adapted when properly set to obscure all erroneous digits of both of said rows when negative numbers are to be read, and to direct the attention to the correct digits on the wheels on which are found the erroneous digits of the second-mentioned row.

3. In a computing machine adapted to add and subtract, the combination with numeral wheels bearing complementary digits in pairs to enable positive numbers to be read from one set of digits and negative numbers to be read from the other set with a known error, of a sight opening adapted to display two rows of the negative digits including one giving the erroneous reading, and a shutter adapted to be set across said two rows to cause the incorrect digits in one row to be obscured and attention to be directed to the part of the other row wherein the correct digits appear.

4. In a computing machine adapted to add and subtract, the combination with numeral wheels bearing complementary digits in pairs to enable positive numbers to be read from one set of digits and negative numbers to be read from the other set with a known error, of a sight-opening adapted to display two rows of the negative digits and an intervening row of positive digits, the row of positive digits giving the correct result when the result is positive and each row of negative digits giving an erroneous reading when the result is negative, and a shutter adapted when properly set to obscure the erroneous digits in each of said rows of negative digits, and to obscure the erroneous digits in the row of positive digits, with the result that all displayed digits are correct.

5. In a computing machine adapted to add and subtract, the combination with numeral wheels having digits thereon adapted to indicate positive numbers and digits paired therewith to indicate negative numbers with a known error, of a shutter adapted to be set to obscure digits of one set of pairs on certain selected wheels and digits of other pairs upon the remaining wheels.

6. In a computing machine adapted to add and subtract, the combination with a casing, of numeral wheels having digits thereon adapted to indicate positive numbers through a sight opening in said casing, and digits paired therewith to indicate through said opening negative numbers with a known error, other digits also exhibited simultaneously through said opening, and a shutter normally exhibiting the positive number digits and adapted to be shifted to display the negative number digits so far as correct and to display of said other digits such ones as will make the negative number correct when read.

7. In a computing machine adapted to add and subtract, the combination with a casing, of numeral wheels having digits thereon adapted to indicate positive numbers through a sight opening in said casing, and digits paired therewith to indicate through said opening negative numbers with a know error, other digits also exhibited simultaneously through said opening so that said digits stand in rows, a shutter slidable across said wheels and normally covering one of said rows of digits, a finger-piece adapted to shift said shutter to uncover one by one the digits of the covered row, a wing of said shutter adapted to simultaneously cover up one by one the digits of an uncovered row, and an extension of said wing adapted to cover up one additional digit.

8. In a computing machine adapted to add and subtract, the combination with a casing, of numeral wheels having digits thereon adapted to indicate positive numbers through a sight opening in said casing, and digits paired therewith to indicate through said opening negative numbers with a known error, other digits also exhibited simultaneously through said opening so that said digits stand in rows, and a device comprising an indicator adapted to be placed across said rows to visibly show how far a number is intended to be read from one row of digits and how far from another row.

9. In a computing machine adapted to add and subtract, the combination with a casing, of numeral wheels having digits thereon adapted to indicate positive numbers through a sight opening in said casing, and digits paired therewith to indicate through said opening negative numbers with a known error, other digits also exhibited simultaneously through said opening so that said digits stand in three rows, a shutter slidable in said casing and comprising a wing normally covering one row, a second wing forming part of said shutter adapted to cover up digits in a second row as they are uncovered in the first row, and an extension of one wing adapted to cover up an additional digit in the third row.

10. In a computing machine adapted to add and subtract, the combination with a casing, of numeral wheels having digits theron adapted to indicate positive numbers through a sight opening in said casing, and digits paired therewith to indicate through said opening negative numbers with a known error, other digits also exhibited simultaneously through said opening, so that said digits stand in three rows, and a finger-piece comprising an indicator adapted to be positioned to indicate where reading in one row should begin and reading in another row should cease.

11. In a computing machine adapted to add and subtract, the combination with a casing, of numeral wheels having digits thereon adapted to indicate positive numbers through a sight opening in said casing, and digits paired therewith to indicate through said opening negative numbers with a known error, other digits also exhibited simultaneously through said opening, so that said digits stand in three rows, a finger-piece comprising an indicator adapted to be positioned to indicate where reading in one row should begin and reading in another row should cease, and means moved by said finger-piece for obscuring erroneous digits to indicate what digits are to be read.

12. In a computing machine adapted to add and subtract, the combination with a casing, of numeral wheels having digits thereon running peripherally thereof and adapted to indicate positive numbers through a sight opening in said casing, digits adapted to indicate negative numbers through said sight opening and arranged peripherally around the wheels in the opposite direction, the sight opening being adapted to display at least one positive and two negative reading digits upon each of the wheels, such that the positive digit paired with one negative digit foots to nine and paired with the other foots to ten, and a shutter adapted, upon a proper setting thereof to direct the attention to one or the other of such negative digits on each wheel so that the correct negative number may be read directly therefrom.

13. In a computing machine adapted to add and subtract, the combination with a casing, of numeral wheels having digit thereon adapted to indicate positive numbers through a sight opening in said casing, by digits running peripherally of the wheels, digits adapted to indicate negative numbers through said sight opening and arranged peripherally around the wheels between the positive digits but in the opposite direction, the sight opening displaying one positive and two adjacent negative digits on each wheel, one of said negative digits when added to the displayed positive digit totaling nine and the other totaling ten when taken therewith, and a shutter adapted to direct attention to such digits in the two negative rows as will yield a correct reading.

14. In a computing machine adapted to add and subtract, the combination with a casing, of numeral wheels having digits thereon adapted to indicate positive numbers through a sight opening in said casing, by digits running peripherally of the wheels, digits adapted to indicate negative numbers through said sight opening and arranged peripherally around the wheels between the positive digits but in the opposite direction, the sight opening displaying one positive and two adjacent negative digits on each wheel, one of said negative digits when added to the displayed positive digit totaling nine and the other totaling ten when taken therewith, and a shutter adapted to obscure both negative and positive incorrect digits and adapted to display the correct negative digits.

15. In an algebraic computing machine, the combination, with number wheels having figures to exhibit positive readings and other figures to exhibit negative readings; of a reading gage having open portions for concomitantly exposing one or more figures of one row and other figures of another row from which a reading of one of said characters is to be taken and for concealing the remaining figures of both of said rows.

16. In an algebraic computing machine, the combination, with number wheels having figures to exhibit positive readings and other figures to exhibit negative readings; of a reading gage having an open portion normally exposing a row of figures from which a reading of one of said characters may be made, and open portions capable of concomitantly exposing one or more figures of one row and other figures of another row from which a reading of the other of said characters may be taken, said gage when positioned for a reading of the last-mentioned character having closed portions for concealing all figures of the last-mentioned rows other than those to be read.

17. In an algebraic computing machine, the combination, with number wheels having figures to exhibit positive readings and other figures to exhibit negative readings; of a reading gage variably positionable, relatively to said number wheels, for concomitantly directing attention to one or more figures of one row and to other figures of another row from which the reading of a number of one of said characters is to be taken.

18. In an algebraic computing machine, the combination, with number wheels having black figures to exhibit positive readings and red figures to exhibit negative readings, of a reading gage having open portions for concomitantly exposing one or more red figures of one row and other red figures of another row from which a negative reading is to be taken.

19. In an algebraic computing machine, the combination, with number wheels having black figures to exhibit positive readings and red figures to exhibit negative readings, of a reading gage having an open portion normally exposing a row of black figures from which a positive reading may be made, and open portions capable of concomitantly exposing one or more red figures of one row and other red figures of another row from which a negative reading may be taken, said gage having closed portions which serve, when positioned for a negative reading, as means to conceal all red figures of the last-mentioned rows other than those to be read.

20. In an algebraic computing machine, the combination, with number wheels having black figures to exhibit positive readings and red figures to exhibit negative readings, of a reading gage variably positionable, relatively to said number wheels, for concomitantly directing attention to one or more red figures of one row and to other red figures of another row from which a negative reading is to be taken.

21. In an algebraic computing machine, the combination with a set of number wheels, one for each of a plurality of denominations, as units, tens, etc., each having figures of two series, the figures of each series comprising a "0" and the digits "1" to "9," those of one series being alternated with those of the other, and arranged in inverse order, the relative arrangement being such that the sums resulting from the successive additions of any digit of one series to its two adjacent digits of the other will equal nine and ten, respectively, of a shield comprising a sight opening of a width such as to expose three contiguous rows of said figures, and a reading gage variably positionable with respect to said shield and having open portions for concomitantly exposing one or more figures of the upper row and other figures from the lower row from which a reading is to be taken and for concealing the remaining figures of both of said rows.

22. In an algebraic computing machine, the combination with a set of number wheels, one for each of a plurality of denominations, as units, tens, etc., each having figures of two series, the figures of each series comprising a "0" and the digits "1" to "9," those of one series being alternated with those of the other, and arranged in inverse order, the relative arrangement being such that the sums resulting from the successive additions of any digit of one series to its two adjacent digits of the other will equal nine and ten, respectively, of a shield comprising a sight opening of a width such as to expose three contiguous rows of said figures, and a variably positionable reading gage having an open portion normally exposing the center row of figures at the sight opening from which a reading of one character may be taken, and other open portions capable of concomitantly exposing one or more figures of the upper row and other figures of the lower row from which a reading of the other of said characters may be taken, said gage, when positioned for a reading of the last mentioned character having closed portions for concealing all figures of the upper and lower rows except those to be read.

23. In an algebraic computing machine, the combination with a set of number wheels, one for each of a plurality of denominations, as units, tens, etc., each having figures of two series, the figures of each series comprising a "0" and the digits "1" to "9,"

those of one series being alternated with those of the other, and arranged in inverse order, the relative arrangement being such that the sum resulting from the successive additions of any digit of one series to its two adjacent digits of the other will equal nine and ten, respectively, of a shield comprising a sight opening of a width such as to expose three contiguous rows of said figures, and a reading gage, variably positionable relatively to said sight opening, for directing attention to one or more figures of the upper row and to other figures of the lower row from which a reading of a number is to be taken.

24. A reading gage for use in a computing machine adapted to add and subtract and having numeral wheels each bearing complementary digits of two different sets to enable positive numbers to be read from a row of one set of digits and negative numbers to be read partly from a row of the other set on one side thereof and partly from a row of the other set on the opposite side of the first-mentioned row, adapted to overlie three rows of digits and to obscure the erroneous digits in each of said rows so as to display the correct digits of a negative result.

25. A reading gage for use in a computing machine adapted to add and subtract and having numeral wheels provided with positive digits thereon to enable positive numbers to be read therefrom and two negative digits paired with each of said positive digits to enable negative numbers to be read therefrom, adapted to be set to obscure digits of one set of pairs on certain selected wheels and digits of other pairs upon the remaining wheels.

26. In a computing machine adapted to add and subtract and having numeral wheels bearing complementary digits of positive and negative sets in pairs to enable positive numbers to be read from one set of digits and negative numbers to be read from the other set, the combination with a frame having a sight-opening adapted to display two rows of negative digits and an intervening row of positive digits, said row of positive digits giving a correct reading when the result is positive and the correct reading in case of a negative result being taken from one of said rows of negative digits for certain of said numeral wheels and from the other of said rows of negative digits for the remaining wheels, of a shutter adapted when set across said rows to obscure the row of erroneous positive digits and to obscure erroneous digits in said rows of negative digits, with the result that all displayed digits are correct.

27. In a computing machine adapted to add and subtract and having numeral wheels bearing complementary digits of two sets in pairs to enable positive numbers to be read from a row of one set of digits, and negative numbers to be read from two adjacent rows of the other set, the combination with a frame having a sight-opening adapted to display two rows of negative digits and an intervening row of positive digits, of a shutter normally exhibiting the row of positive digits and adapted when shifted to display the negative digits of one of said rows so far as correct, and to display such digits of the other of said negative rows as will make the negative number correct when read.

28. In a computing machine adapted to add and subtract algebraically, the combination with numeral wheels arranged in order transversely of the machine, each bearing complementary digits of two sets, to enable positive results to be read from a row of digits of one set and negative results to be read from a row of digits of the other set with a known error, of a shutter guided for movement transversely of the machine and adapted, when properly positioned, to obscure the erroneous digits in the last-mentioned row, and to direct attention to the remaining correct digits in another row of digits of the set from which the negative results may be read.

29. In a computing machine adapted to add and subtract algebraically, the combination with numeral wheels having positive and negative digits arranged in opposite directions peripherally thereof, to enable positive results or the complements of negative results to be read from one row of positive digits, of a shutter adapted to direct attention to negative digits to indicate the correct negative result on the numeral wheels when the latter are positioned to show on said row of positive digits the complement of the negative result.

30. In a computing machine adapted to add and subtract algebraically, the combination with numeral wheels each having thereon positive and negative digits, of a manually operable shutter so shaped that, when properly positioned, attention will be directed to positive digits giving a correct reading of a positive result or the complement of a negative result, and in the latter case when moved to another position to direct attention to negative digits giving the proper negative result.

LOUIS E. GILES.

Witnesses:
EDITH B. LIBBEY,
JENNIE P. THORNE.